United States Patent
Takezawa et al.

(10) Patent No.: US 9,809,704 B2
(45) Date of Patent: Nov. 7, 2017

(54) RUBBER COMPOSITION AND MOLDED ARTICLE

(71) Applicant: Sumitomo Chemical Company, Limited, Tokyo (JP)

(72) Inventors: Tetsuji Takezawa, Ichihara (JP); Sadayuki Nakano, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/105,878

(22) PCT Filed: Dec. 18, 2014

(86) PCT No.: PCT/JP2014/084447
§ 371 (c)(1),
(2) Date: Jun. 17, 2016

(87) PCT Pub. No.: WO2015/093622
PCT Pub. Date: Jun. 25, 2015

(65) Prior Publication Data
US 2016/0304710 A1    Oct. 20, 2016

(30) Foreign Application Priority Data
Dec. 20, 2013 (JP) .................................. 2013-263415

(51) Int. Cl.
C08L 23/16 (2006.01)
C08F 210/18 (2006.01)
C08K 5/14 (2006.01)

(52) U.S. Cl.
CPC ............ C08L 23/16 (2013.01); C08F 210/18 (2013.01); C08K 5/14 (2013.01)

(58) Field of Classification Search
CPC ...... C08L 23/16; C08F 210/18; C08F 236/20; C08F 2500/25; C08F 2500/17; C08K 5/14
See application file for complete search history.

(56) References Cited

U.S. PATENT DOCUMENTS

| | | |
|---|---|---|
| 2010/0222445 A1 | 9/2010 | Nakano |
| 2012/0059123 A1 | 3/2012 | Nakano |

FOREIGN PATENT DOCUMENTS

| | | |
|---|---|---|
| CN | 101817955 A | 9/2010 |
| JP | H04-96950 A | 3/1992 |
| JP | H 09249778 A | 9/1997 |
| JP | H 10110071 A | 4/1998 |
| JP | 2000-143874 A | 5/2000 |
| JP | 2002080664 A | 3/2002 |
| JP | 2008195870 A | 8/2008 |
| JP | 2010222576 A | 10/2010 |
| JP | 2011195808 A | 10/2011 |
| JP | 2012214582 A | 11/2012 |

OTHER PUBLICATIONS

Int'l Search Report dated Mar. 17, 2015 in Int'l Application No. PCT/JP2014/084447.
Written Opinion dated Mar. 17, 2015 in Int'l Application No. PCT/JP2014/084447.
Int'l Preliminary Report dated Jun. 21, 2016 in Int'l Application No. PCT/JP2014/084447.
Search Report dated May 4, 2017 in EP Application No. 148720501.
Office Action dated May 2, 2017 in CN Application No. 2014800686758.

*Primary Examiner* — Nathan M Nutter
(74) *Attorney, Agent, or Firm* — Panitch Schwarze Belisario & Nadel LLP

(57) ABSTRACT

The rubber composition contains the following component (A), the following component (B), and the following component (C). The component (A) is an ethylene-α-olefin-nonconjugated polyene copolymer rubber containing an ethylene unit, an α-olefin unit, and a nonconjugated polyene unit, a number of carbon atoms of the α-olefin unit is 3 to 20, a limiting viscosity measured in 135° C. tetralin is 2.8 dl/g to 5 dl/g, a content of the ethylene unit is 70 mol % to 90 mol % (where a total of the content of the ethylene unit and a content of the α-olefin unit in the component (A) is 100 mol %), and a content of the nonconjugated polyene unit is 2 wt % to 20 wt % (where a total amount of the component (A) is 100 wt %); the component (B) is an organic peroxide; and the component (C) is a thermosetting prepolymer.

4 Claims, No Drawings

RUBBER COMPOSITION AND MOLDED ARTICLE

CROSS-REFERENCE TO RELATED APPLICATION

This application is a Section 371 of International Application No. PCT/JP2014/084447, filed Dec. 18, 2014, which was published in the Japanese language on Jun. 25, 2015, under International Publication No. WO 2015/093622 A1, and the disclosure of which is incorporated herein by reference.

TECHNICAL FIELD

The present invention relates to a rubber composition containing an ethylene-α-olefin-nonconjugated polyene copolymer rubber, an organic peroxide and a thermosetting prepolymer, and a molded article obtained by vulcanizing the rubber composition.

BACKGROUND ART

Chloroprene rubbers are used in automobile parts such as transmission oil cooler hoses and power steering hoses, and industrial rubber parts of which oil resistance is required such as various hoses. On the other hand, ethylene-α-olefin-nonconjugated diene-based rubbers are used in automobile parts such as weather strips, radiator hoses and brake parts, and industrial rubber parts of which heat resistance is required such as window frames and heat-insulating materials.

The performance required of the industrial rubber parts as described above has been increasing year after year, and studies for meeting the required performance have been made.

In Patent Literature 1, a rubber composition is described which is prepared by blending predetermined amounts of a thiazole compound, a thiuram compound and a thiourea compound into a chloroprene rubber composition comprising 100 parts by weight of a chloroprene rubber and 5 parts by weight or more and 45 parts by weight or less of an ethylene-propylene-diene copolymer rubber.

In Patent Literature 2, a rubber composition is described which is prepared by adding an organic peroxide and a thermosetting prepolymer to a copolymer rubber in which ethylene, an α-olefin and 5-ethylidene-2-norbornene are essential constituents.

CITATION LIST

Patent Literature

[Patent Literature 1] JP 2008-195870 A
[Patent Literature 2] JP 2002-80664 A

SUMMARY OF INVENTION

Technical Problem

In addition, parts used in the engine room of an automobile in recent years are used in the temperature range of room temperature to high temperature, and come into contact with the engine oil under a high temperature atmosphere. The automobile parts used in such circumstances are required not to swell with an oil such as an engine oil under a high temperature atmosphere, that is, required to be excellent in oil resistance under high temperature.

However, the oil resistance under high temperature of molded bodies obtained by vulcanizing the rubber compositions described in the above Patent Literatures is not satisfactory.

Under such circumstances, it is an object of the present invention to provide a rubber composition with which it is possible to obtain a molded article exhibiting excellent oil resistance under high temperature, and a molded article exhibiting excellent oil resistance under high temperature obtained by vulcanizing the rubber composition.

Solution to Problem

The present invention concerns a rubber composition comprising the following component (A), the following component (B) and the following component (C).

The component (A) is an ethylene-α-olefin-nonconjugated polyene copolymer rubber containing an ethylene unit, an α-olefin unit, and a nonconjugated polyene unit, a number of carbon atoms of the α-olefin unit is 3 or more and 20 or less, a limiting viscosity measured in 135° C. tetralin is 2.8 dl/g or more and 5 dl/g or less, a content of the ethylene unit is 70 mol % or more and 90 mol % or less (where a total of the content of the ethylene unit and a content of the α-olefin unit in the ethylene-α-olefin-nonconjugated polyene copolymer rubber is 100 mol %), and a content of the nonconjugated polyene unit is 2% by weight or more and 14% by weight or less (where a total amount of the ethylene-α-olefin-nonconjugated polyene copolymer rubber is 100% by weight); the component (B) is an organic peroxide; and the component (C) is a thermosetting prepolymer.

Advantageous Effects of Invention

According to the present invention, it is possible to obtain a molded article exhibiting excellent oil resistance under high temperature.

DESCRIPTION OF EMBODIMENTS

[Rubber Composition]
A rubber composition according to the present invention contains the component (A), the component (B) and the component (C).
(Component (A))
The component (A) is an ethylene-α-olefin-nonconjugated polyene copolymer rubber containing an ethylene unit, an α-olefin unit, and a nonconjugated polyene unit.

The limiting viscosity of the component (A) measured in 135° C. tetralin is 2.8 dl/g or more and 5 dl/g or less, preferably 2.9 dl/g or more and 5.0 dl/g or less, and more preferably 3.0 dl/g or more and 5.0 dl/g or less. By setting the limiting viscosity at 2.8 dl/g or more, it is possible to increase the oil, resistance of the obtained molded article at high temperature. In addition, by setting the limiting viscosity at 5 dl/g or less, it is possible to improve the moldability of the rubber composition.

The limiting viscosity of the component (A) is a value obtained by measuring the reduced viscosity (viscosity number) of a solution in which the concentration of the component (A) is known in tetralin at 135° C. using a viscometer, and calculating the limiting viscosity from the measured reduced viscosity according to the calculation method described in "Kobunshi Yoeki (Polymer Solutions), Kobunshi Jikkengaku (Polymer Experimental Science) 11"

(published by Kyoritsu Shuppan Co., Ltd. in 1982), p. 491. Examples of the reduced viscosity measuring apparatus include automatic viscosity measuring apparatuses equipped with Ubbelohde type viscometers.

Examples of the α-olefin used in the component (A) include α-olefins in which the number of carbon atoms is 3 or more and 20 or less, and specifically include linear olefins such as propylene, 1-butene, 1-pentene, 1-hexene, 1-heptene, 1-octene, 1-nonene and 1-decene; branched olefins such as 3-methyl-1-butene, 3-methyl-1-pentene and 4-methyl-1-pentene; and cyclic olefins such as cyclohexene. These may be used alone, or two or more of these may be used in combination. As the α-olefin, propylene or 1-butene is preferable.

Examples of the nonconjugated polyene used in the component (A) preferably include nonconjugated polyenes in which the number of carbon atoms is 3 or more and 20 or less. Examples of the nonconjugated polyene specifically include chain nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetraindene, 5-vinylnorbornene, 5-ethylidene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylene-2-norbornene, 4-ethylidene-8-methyl-1,7-nonadiene, 5,9,13-trimethyl-1,4,8,12-tetradecadiene, 4-ethylidene-12-methyl-1,11-pentadecadiene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, 6,10-dimethyl-1,5,9-undecatriene, 5,9-dimethyl-1,4,8-decatriene, 13-ethyl-9-methyl-1,9,12-pentadecatriene, 5,9,8,14,16-trimethyl-1,7,14-hexadecatriene and 1,4,9-decatriene. These may be used alone, or two or more of these may be used in combination. Among these, it is preferable to use 5-ethylidene-2-norbornene, dicyclopentadiene, or a combination of these.

The content of the ethylene unit in the component (A) is 70 mol % or more and 90 mol % or less, preferably 75 mol % or more and 85 mol % or less, and the content of the α-olefin unit is 10 mol % or more and 30 mol % or less, preferably 15 mol % or more and 25 mol % or less, where the total of the content of the ethylene unit and the content of the α-olefin unit in the component (A) is 100 mol %. By setting the content of the ethylene unit at 70 mol % or more, it is possible to improve the oil resistance of the obtained molded article under high temperature.

The content of the ethylene unit and the content of the α-olefin unit in the component (A) are obtained according to methods described in literatures (Sekigaikyusyu Supekutoru Niyoru Poriechiren No Kyarakutarizeshon (Characterization of Polyethylene by Infrared Absorption Spectrum) by Takayama, Usami, et al., and Die Makromolekulare Chemie, 177, 461, (1976) by Mc Rae, M. A., Maddms, W. F, et al.) from the infrared absorption spectrum measured by an infrared spectrophotometer.

In addition, the content of the nonconjugated polyene unit in the component (A) is 2% by weight or more and 20% by weight or less, preferably 4% by weight or more and 20% by weight or less, and more preferably 8% by weight or more and 20% by weight or less, where the total amount of the component (A) is 100% by weight. By setting the content of the nonconjugated polyene unit at 2% by weight or more, it is possible to improve the oil resistance of the obtained molded article under high temperature. In addition, by setting the content of the nonconjugated polyene unit at 20% by weight or less, it is possible to improve the weather resistance of the obtained molded article.

The content of the nonconjugated polyene unit in the component (A) is obtained by obtaining the molar content of double bonds from the intensity of a peak derived from the nonconjugated polyene measured by an infrared spectrophotometer, calculating the iodine value from the molar content, and calculating by the following formula (1):

(the content of nonconjugated polyene unit)=(the iodine value)×(the molecular weight of nonconjugated polyene)÷(the molecular weight of iodine)   formula (1)

The above "ethylene unit," "α-olefin unit," and "nonconjugated polyene unit" mean "a monomer unit derived from ethylene," "a monomer unit derived from an α-olefin," and "a monomer unit derived from a nonconjugated polyene" respectively.

It is preferable that the molecular weight distribution (Mw/Mn) of the component (A) be 2 or more and 5 or less, and it is more preferable that the molecular weight distribution (Mw/Mn) of the component (A) be 2.2 or more and 5 or less. By setting the molecular weight distribution at 2.2 or more, the roll processability can be improved. In addition, by setting the molecular weight distribution at 5 or less, the mechanical properties of the molded article can be improved.

The molecular weight distribution in the present invention is a ratio (Mw/Mn) calculated from weight average molecular weight (Mw) and number average molecular weight (Mn) in terms of polystyrene measured using gel permeation chromatography (hereinafter described as GPC).

Examples of weight average molecular weight and number average molecular weight measurement conditions include the following conditions:
(1) GPC apparatus: trade name HLC-8121GPC/HT, manufactured by Tosoh Corporation
(2) Column: trade name TSKgel GMHHR-H(S)HT, manufactured by Tosoh Corporation
(3) Molecular weight standard substance: polystyrene having a molecular weight of 500 or more and 20000000 or less
(4) Elution solvent flow velocity: 1.0 ml/min
(5) Measurement temperature: 140° C.
(6) Elution solvent: orthodichlorobenzene
(7) Sample injection amount: 500 µl
(8) Detector: differential refractometer Examples of the component (A) specifically include ethylene-propylene-(5-ethylidene-2-norbornene), ethylene-propylene-dicyclopentadiene, ethylene-propylene-(1,4-hexadiene), ethylene-propylene-(1,6-octadiene), ethylene-propylene-(2-methyl-1,5-hexadiene), ethylene-propylene-(6-methyl-1,5-heptadiene), ethylene-propylene-(7-methyl-1,6-octadiene), ethylene-propylene-cyclohexadiene, ethylene-propylene-methyltetraindene, ethylene-propylene-(5-vinylnorbornene), ethylene-propylene-(5-(2-propenyl)-2-norbornene), ethylene-propylene-(5-(3-butenyl)-2-norbornene), ethylene-propylene-(5-(4-pentenyl)-2-norbornene), ethylene-propylene-(5-(5-hexenyl)-2-norbornene), ethylene-propylene-(5-(5-heptenyl)-2-norbornene), ethylene-propylene-(5-(7-octenyl)-2-norbornene), ethylene-propylene-(5-methylene-2-norbornene), ethylene-propylene-(4-ethylidene-8-methyl-1,7-nonadiene), ethylene-propylene-(5,9,13-trimethyl-1,4,8,12-tetradecadiene), ethylene-propylene-(4-ethylidene-12-methyl-1,11-pentadecadiene), ethylene-propylene-(6-chloromethyl-5-isopropenyl-2-norbornene), ethylene-propylene-(2,3-diisopropylidene-5-norbornene), ethylenepropylene-(2-ethylidene-3-isopropylidene-5-norbornene), ethylene-propylene-(2-propenyl-2,2-norbornadiene), ethylene-propylene-(1,3,7-octatriene), ethylene-propylene-(6,10-dimethyl-1,5,9-undecatriene), ethylene-propylene-(5,9-dimethyl-1,4,8-decatriene), ethylene-propylene-(13-ethyl-9-methyl-1,9,12-pentadecatriene), ethylene-propylene-(5,9,8,14,16-trimethyl-1,7,14-hexadecatriene), and ethylene-propylene-(1,4,9-decatriene). These may be alone and may be mixtures of two or more. As the component (A), ethylene-propylene-(5-ethylidene-2-norbornene) or ethylene-propylene-dicyclopentadiene is preferable, and ethylene-propylene-(5-ethylidene-2-norbornene) is more preferable.

When the component (A) is a mixture of two or more copolymers, the limiting viscosity of the component (A) is the limiting viscosity of the mixture, and the content of the ethylene unit, the content of the α-olefin unit, and the content of the nonconjugated polyene unit are the content of the ethylene unit contained in the whole of the mixture, the content of the α-olefin unit contained in the whole of the mixture, and the content of the nonconjugated polyene unit contained in the whole of the mixture respectively. The molecular weight distribution is the molecular weight distribution of the mixture.

(Method for Producing Component (A))

As the method for producing the component (A), a method using a polymerization catalyst component (catalyst component 1) consisting of a vanadium compound represented by the following formula (1) and an organoaluminum compound represented by the following formula (2), and a polymerization catalyst component (catalyst component 2) consisting of a vanadium compound represented by the following formula (3) and an organoaluminum compound represented by the following formula (2) is preferable.

$$VO(OR)_m X_{3-m} \quad (1)$$

In formula (1), R represents a linear hydrocarbon group in which the number of carbon atoms is 1 or more and 8 or less, X represents a halogen atom, and m represents a number satisfying $0 \leq m \leq 3$.

$$R''_j AlX''_{3-j} \quad (2)$$

In formula (2), R" represents a hydrocarbon group, X" represents a halogen atom, and j represents a number satisfying $0 < j \leq 3$.

$$VO(OR')_n X'_{3-n} \quad (3)$$

In formula (3), R' represents a secondary or tertiary hydrocarbon group in which the number of carbon atoms is 3 or more and 8 or less, X' represents a halogen atom, and n represents a number satisfying $0 < n \leq 3$.

In the above formula (1), R represents a linear hydrocarbon group in which the number of carbon atoms is 1 or more and 8 or less. Examples of R specifically include a methyl group, an ethyl group, a n-propyl group, a n-butyl group, a n-pentyl group, and a n-hexyl group. As R, a methyl group, an ethyl group, or a n-propyl group is preferable. X is a halogen atom, and examples of X include a fluorine atom and a chlorine atom. In addition, m represents a number satisfying $0 \leq m \leq 3$ and is preferably a number satisfying $0 \leq m \leq 2$.

Examples of the vanadium compound represented by formula (1) specifically include $VOCl_3$, $VO(OCH_3)Cl_2$, $VO(OC_2H_5)Cl_2$, $VO(O(n-C_3H_7))Cl_2$, $VO(O(n-C_4H_9))Cl_2$, $VO(O(n-C_5H_{11}))Cl_2$, $VO(O(n-C_6H_{13}))Cl_2$, $VO(O(n-C_7H_{15}))Cl_2$, $VO(O(n-C_8H_{17}))Cl_2$, $VO(OCH_3)_{0.5}Cl_{2.5}$, $VO(OC_2H_5)_{0.5}Cl_{2.5}$, $VO(O(n-C_3-H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}OCl_{2.5}$, $VO(O(n-C_8H_{17}))_{0.5}Cl_{2.5}$, $VO(OCH_3)_{1.5}Cl_{0.5}$, $VO(OC_2H_5)_{1.5}Cl_{0.5}$, $VO(O(n-C_3H_7))_{1.5}Cl_{0.5}$, $VO(O(n-C_4H_9))_{1.5}Cl_{0.5}$, $VO(O(n-C_5H_{11}))_{1.5}Cl_{0.5}$, $VO(O(n-C_6H_{13}))_{1.5}Cl_{0.5}$, $VO(O(n-C_7H_{15}))_{1.5}Cl_{0.5}$, $VO(O(n-C_8H_{17}))_{1.5}Cl_{0.5}$, $VO(OCH_3)_{0.8}Cl_{2.2}$, $VO(OC_2H_5)_{0.8}Cl2.2$, $VO(O(n-C3H7))0.8Cl2.2$, $VO(O(n-C4H9))_{0.8}Cl_{2.2}$, $VO(O(n-C_5H_{11}))_{0.8}Cl_{2.2}$, $VO(O(n-C_6H_{13}))_{0.8}Cl_{2.2}$, $VO(O(n-C_7H_{15}))_{0.8}Cl_{2.2}$, and $VO(O(n-C_8H_{17}))_{0.8}Cl_{2.2}$. Among these, $VOCl_3$, $VO(OC_2H_5)Cl_2$, $VO(OC_2H_5)_{0.5}Cl_{2.5}$, $VO(OC_2H_5)_{1.5}Cl_{0.5}$, $VO(OC_2H_5)_{0.8}Cl_{2.2}$, or $VO(OC_2H_5)_{1.8}Cl_{1.2}$ is preferable.

In addition, among the vanadium compounds represented by formula (1), compounds in which in is more than 0 are obtained by a method of reacting $VOX_3$ and ROH. For example, the reaction of $VOCl_3$ and $C_2H_5OH$ is represented by the following formula:

$$VOCl_3 + m.C_2H_5OH \rightarrow VO(OC_2H_5)_m Cl_{3-m} + m.HCl$$

In formula (2), R" represents a hydrocarbon group. Specifically, alkyl groups in which the number of carbon atoms is 1 or more and 10 or less such as a methyl group, an ethyl group, a n-propyl group, an iso-propyl group, a n-butyl group, an iso-butyl group, a pentyl group, and a hexyl group are preferable. X" represents a halogen atom, and examples of X" include a fluorine atom and a chlorine atom. In addition, j represents a number satisfying $0 < j \leq 3$ and is preferably a number satisfying $0 \leq j \leq 2$.

Examples of the organoaluminum compound represented by formula (2) specifically include $(C_2H_5)_2AlCl$, $(n-C_4H_9)_2AlCl$, $(iso-C_4H_9)_2AlCl$, $(n-C_6H_{13})_2AlCl$, $(n-C_2H_5)_{1.5}AlCl_{1.5}$, $(n-C_4H_9)_{1.5}AlCl_{1.5}$, $(iso-C_4H_9)_{1.5}AlCl_{1.5}$, $(N-C_6H_{13})_{1.5}AlCl_{1.5}$, $C_2H_5AlCl_2$, $(n-C_4H_9)AlCl_2$, $(iso-C4H_9)AlCl_2$, and $(n-C_6H_{13})AlCl_2$.

In formula (3), R' represents a secondary or tertiary hydrocarbon group in which the number of carbon atoms is 3 or more and 8 or less, and examples of R' include secondary or tertiary alkyl groups in which the number of carbon atoms is 3 or more and 8 or less such as an isopropyl group, a sec-butyl group, and a tert-butyl group. Among these, secondary or tertiary alkyl groups in which the number of carbon atoms is 3 or more and 4 or less are preferable. X' represents a halogen atom, and examples of X' include a fluorine atom and a chlorine atom. In addition, n represents a number satisfying $0 < n \leq 3$ and is preferably a number satisfying $0.5 < n \leq 2$.

Examples of the vanadium compound represented by formula (3) include $VO(O(iso-C_3H_7))Cl_2$, $VO(O(iso-C_3H_7))_{0.5}Cl_{2.5}$, $VO(O(iso-C_3H_7))_{1.5}Cl_{0.5}$, and $VO(O(iso-C_3H_7))_{0.8}Cl_{2.2}$. Preferably, the vanadium compound represented by formula (3) is $VO(O(iso-C_3H_7))_{0.8}Cl_{2.2}$.

The vanadium compound represented by formula (3) is obtained by a method of reacting $VOX'_3$ and R'OH. For example, the reaction of $VOCl_3$ and $iso-C_3H_7OH$ is represented by the following formula:

$$VOCl_3 + n.iso-C_3H_7OH \rightarrow VO(O(iso-C_3H_7)nCl_{3-n} + n.HCl$$

In the production of the component (A), it is preferable that the molar ratio of the amount of the organoaluminum compound used to the amount of the vanadium compound used (the number of moles of the organoaluminum compound/the number of moles of the vanadium compound) in the catalyst component 1 be 2.5 or more and 50 or less, and it is preferable that the molar ratio of the amount of the organoaluminum compound used to the amount of the vanadium compound used in the catalyst component 2 be 2.5 or more and 50 or less. In addition, it is preferable that the molar ratio of the amount of the organoaluminum compounds used to the amount of the vanadium compounds used contained in the whole of the catalyst components in which the catalyst component 1 and the catalyst component 2 are put together be 2.5 or more and 50 or less.

Examples of the method for producing the component (A) include a method using two reaction vessels coupled in series which comprises charging either one of the catalyst component 1 or the catalyst component 2 into a first reaction vessel to perform polymerization, feeding the solution containing the polymer component obtained to a second reaction vessel, and charging the other catalyst component into the second reaction vessel to perform polymerization. Examples of such a method include a method comprising supplying ethylene, an α-olefin, a nonconjugated polyene, a solvent, hydrogen and the catalyst component 1 to a first reaction vessel to produce a polymer component, feeding the solution containing the polymer obtained to a second reaction vessel, and supplying ethylene, the α-olefin, the nonconjugated polyene, the solvent, hydrogen and the catalyst component 2 to the second reaction vessel to perform polymerization.

As the solvent used for the polymerization, inert solvents such as aliphatic hydrocarbons such as propane, butane, isobutane, pentane, hexane, heptane and octane; and alicyclic hydrocarbons such as cyclopentane and cyclohexane can be used.

The polymerization temperature is usually −20° C. or more and 200° C. or less, preferably 0° C. or more and 150° C. or less, and more preferably 20° C. or more and 120° C. or less. In addition, the polymerization pressure is usually 0.1 MPa or more an 10 MPa or less, preferably 0.1 MPa or more and 5 MPa or less, and more preferably 0.1 MPa or more and 3 MPa or less.

The component (A) may be mixed with another component as an oil-extended rubber obtained by blending an extender oil such as a paraffin-based oil or a naphthene-based oil into the component (A).

(Component (B))

The component (B) is an organic peroxide. The organic peroxide is a compound that vulcanizes a rubber composition. Examples of the component (B) specifically include dicumyl peroxide, 2,5-dimethyl-2,5-di(tert-butylperoxy)hexane, 2,5-dimethyl-2,5-di(benzoylperoxy)hexane, 2,5-dimethyl-2,5-(tert-butylperoxy)hexyne-3, di-tert-butyl peroxide, di-tert-butyl peroxide-3,3,5-trimethylcyclohexane, and tert-butyl hydroperoxide. As the component (B), dicumyl peroxide, di-tert-butyl peroxide, or di-tert-butylperoxide-3,3,5-trimethylcyclohexane is preferable. These may be used alone, or two or more of these may be used in combination.

The amount of the component (B) blended in the rubber composition is preferably 0.1 parts by weight or more and 20 parts by weight or less, more preferably 2 parts by weight or more and 15 parts by weight or less, and further preferably 5 parts by weight or more and 13 parts by weight or less when the amount of the component (A) blended is 100 parts by weight. By setting the amount of the component (B) blended at 0.1 parts by weight or more, it is possible to improve the oil resistance of the obtained molded article under high temperature. In addition, by setting the amount blended at 20 parts by weight or less, it is possible to suppress a decrease in the breaking elongation of the obtained molded article.

(Component (C))

The component (C) is a thermosetting prepolymer. The thermosetting prepolymer refers to a polymer obtained by polymerizing a monomer to some extent, the polymer curing by heat.

It is preferable that the weight average molecular weight (in terms of polystyrene) of the thermosetting prepolymer measured by GPC be 5000 or more and 100000 or less. In addition, it is preferable that the iodine value of the thermosetting prepolymer be 40 or more and 100 or less. The iodine value is obtained in accordance with HS K0070.

As the component (C), at least one thermosetting prepolymer selected from the group consisting of a diallyl phthalate prepolymer and a diallyl isophthalate prepolymer is preferable. The diallyl phthalate prepolymer is a prepolymer of diallyl phthalate, and the diallyl isophthalate prepolymer is a prepolymer of diallyl isophthalate. For these, commercial products may be used. Examples of the commercial product of the diallyl phthalate prepolymer include "DAISO DAP" (trade name) manufactured by DAISO CO., LTD. In addition, examples of the diallyl isophthalate prepolymer include "DAISO ISODAP" (trade name) manufactured by DAISO CO., LTD.

The amount of the component (C) blended in the rubber composition is preferably 0.1 parts by weight or more and 20 parts by weight or less, more preferably 0.5 parts by weight or more and 15 parts by weight or less, and further preferably 1 part by weight or more and 20 parts by weight or less when the amount of the component (A) blended is 100 parts by weight. By setting the amount of the component (C) blended at 0.1 parts by weight or more, it is possible to improve the oil resistance of the obtained molded article under high temperature. In addition, by setting the amount blended at 20 parts by weight or less, it is possible to suppress a decrease in the breaking elongation of the obtained molded article.

(Other Additives)

In the rubber composition, in addition to the above components, an extender oil, a reinforcing agent, a softening agent, a vulcanizing accelerator, a vulcanizing coagent, a processing aid, an antioxidant, a silane coupling agent, a rubber other than the component (A), and the like may be added.

The reinforcing agent is an additive that can be blended into a rubber composition to improve the mechanical properties of a molded article obtained by vulcanizing the rubber composition as described in Binran Gomu-Purasuchikku Haigo Yakuhin (Handbook Rubber and Plastic Blended Chemicals (published by Rubber Digest on Apr. 20, 1981). Examples of the reinforcing agent include carbon black, dry method silica, wet method silica, synthetic silicate-based silica, colloidal silica, basic magnesium carbonate, activated calcium carbonate, heavy calcium carbonate, light calcium carbonate, mica, magnesium silicate, aluminum silicate, lignin, aluminum hydroxide, and magnesium hydroxide.

The amount of the reinforcing agent blended in the rubber composition is preferably 50 parts by weight or more and 250 parts by weight or less, more preferably 100 parts by weight or more and 200 parts by weight or less, and further preferably 120 parts by weight or more and 180 parts by weight or less when the amount of the component (A) blended is 100 parts by weight.

Examples of the softening agent include process oils, lubricants, paraffins, liquid paraffins, petroleum asphalt, barium stearate, and zinc laurate.

The amount of the softening agent blended in the rubber composition is preferably 50 parts by weight or more and 250 parts by weight or less, more preferably 100 parts by weight or more and 200 parts by weight or less, and further preferably 120 parts by weight or more and 180 parts by weight or less when the amount of the component (A) blended is 100 parts by weight.

Examples of the vulcanizing accelerator include tetramethylthiuram monosulfide, tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N-diphenylthiuram disulfide, N,N'-dioctadecyl-N, N-diisopropylthiuram disulfide, N-cyclohexyl-2-benzothiazole-sulfenamide, N-oxydiethylene-2-benzothiazolesulfenamide, N,N-diisopropyl-2-benzothiazolesulfenamide, 2-mercaptoberizothiazole, 2-(2,4-dinitrophenyl)mercaptobenzothiazol 2-(2,6-diethyl-4-morpholinothio)benzothiazole, dibenzothiazyl-disulfide, diphenylguanidine, triphenylguanidine, diorthotolylguanidine, orthotolyl-bi-guanide, diphenylguanidine-phthalate, n-butyraldehydeaniline, hexamethylenetetramine, acetaldehyde ammonia, 2-mercaptoimidazoline, thiocarbanilide, diethylthiourea dibutylthiourea, trimethylthiourea, diorthotolylthiourea, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate, and ethylenethiourea.

The amount of the vulcanizing accelerator blended in the rubber composition is preferably 0.05 parts by weight or more and 20 parts by weight or less, more preferably 0.1 parts by weight or more and 8 parts by weight or less, when the amount of the component (A) blended is 100 parts by weight.

Examples of the vulcanizing coagent include triallyl isocyanurate, N,N'-m-phenylenebismaleimide, methacrylic acid, methyl methacrylate, ethyl methacrylate, propyl methacrylate, isopropyl methacrylate, n-butyl methacrylate, isobutyl methacrylate, sec-butyl methacrylate, tert-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethylol ethane trimethacrylate, trimethylolpropane trimethacrylate, allyl glycidyl ether, N-methylolmethacrylamide, 2,2-bis(4-methacryloxypolyethoxyphenyl)propane, aluminum methacrylate, zinc methacrylate, calcium methacrylate, magnesium methacrylate, 3-chloro-2-hydroxypropyl methacrylate, and zinc oxide.

The amount of the vulcanizing coagent blended in the rubber composition is preferably 0.05 parts by weight or more and 15 parts by weight or less, more preferably 0.1 parts by weight or more and 8 parts by weight or less, when the amount of the component (A) blended is 100 parts by weight.

Examples of the processing aid include fatty acids such as oleic acid, palmitic acid and stearic acid; fatty acid metal salts such as zinc stearate and calcium stearate; fatty acid esters; and glycols such as ethylene glycol and polyethylene glycol. These can be used alone, or two or more of these can be used in combination. The amount of the processing aid blended in the rubber composition is preferably 0.2 parts by weight or more and 10 parts by weight or less when the amount of the component (A) blended is 100 parts by weight.

Examples of the antioxidant include aromatic secondary amine stabilizers such as phenylnaphthylamine and N,N-di-2-naphtlylphenylenediamine; phenol stabilizers such as dibutylhydroxytoluene, tetrakis[methylene(3,5-di-tert-butyl-4-hydroxy)hydrocinnamate]methane; thioether stabilizers such as bis[2-methyl-4-(3-n-alkylthiopropionyloxy)-5-tert-butylphenyl] sulfide; carbamate stabilizers such as nickel dibutyldithiocarbamate; sulfur-based stabilizers such as 2-mercaptobenzimidazole and 2-mercaptomethylbenzimidazole; and ketoamine condensate stabilizers such as polymers of 2,2,4-trimethyl-1,2-dihydroquinoline. These can be used alone, or two or more of these can be used in combination. The amount of the antioxidant blended in the rubber composition is preferably 0.1 parts by weight or more and 10 parts by weight or less when the amount of the component (A) blended is 100 parts by weight.

Examples of the silane coupling agent include silane-based silane coupling agents, vinyl-based silane coupling agents, methacrylic silane coupling agents, epoxy-based silane coupling agents, mercapto and sulfur silane-based silane coupling agents, amino-based silane coupling agents, ureide-based silane coupling agents, and isocyanate-based silane coupling agents. The amount of the silane coupling agent blended in the rubber composition is preferably 0.1 parts by weight or more and 10 parts by weight or less when the amount of the component (A) blended is 100 parts by weight.

Examples of the rubber other than the component (A) include natural rubbers, isoprene rubbers, butadiene rubbers, styrene butadiene rubbers, chloroprene rubbers, nitrile rubbers, butyl rubbers, chlorosulfonated polyethylene, acrylic rubbers, epichlorohydrin rubbers, polysuifide rubbers, silicone rubbers, and fluororubbers.

[Molded Article]

A molded article according to the present invention is a molded article obtained by vulcanizing the above rubber composition. The method for producing the molded article consists of the kneading step of kneading the rubber composition, and the vulcanizing step of vulcanizing this rubber composition.

In the kneading step, the above component (A), component (B) and component (C), and various additives as needed are mixed in an appropriate order, and kneaded using a closed kneading machine such as Banbury mixer, a kneader, or a twin-screw extruder. For example, it is possible to first mix and knead the component (A) and the component (C), and various additives as needed, and then mix the component (B), and various additives as needed, with the obtained kneaded material and further knead the mixture. It is preferable that the kneading be performed until the components are uniformly mixed, and it is preferable that the kneading time be 1 minute or more and 60 minutes or less. It is preferable that the kneading temperature be 40° C. or more and 200° C. or less. This step is carried out under conditions in which the component (B) does not react with the component (A), and at the completion of the kneading step, the component (A) and the component (B) remain without reacting.

In the vulcanizing step, the rubber composition obtained in the kneading step is heated by a molding machine such as an injection molding machine, a compression molding machine, or a hot air vulcanizing apparatus at 120° C. or more, preferably 140° C. or more and 220° C. or less, for about 1 minute or more and 60 minutes or less to react the component (A) and the component (B).

The molded article obtained by such a method exhibits excellent oil resistance under high temperature and can be used as products such as engine mounts, muffler hangers, strut mounts, torsional dampers, shift lever mounts, torsion rubbers for clutches, centering bushes, tube dampers, torque bushes, suspension bushes, body mounts, cab mounts, member mounts, strut bar cushions, tension rod bushes, arm bushes, lowering bushes, radiator supports, damper pulleys, rack mounts, emission control hoses, fuel hoses, air conditioner hoses, power steering hoses, brake hoses, clutch hoses, master back hoses, CVJ boots, rack & pinion boots, timing belts, wiper blades, and dry cleaning washing machine hoses.

EXAMPLES

The present invention will be described below based on Examples, but the present invention is not limited to these.

[Measurement and Evaluation Methods]

(1) Content of Ethylene Unit and Content of Propylene Unit (Unit: Mol %)

An ethylene-propylene-(5-ethylidene-2-norbornene) copolymer rubber was molded into a film having a thickness of about 0.1 mm by a hot press machine, and the infrared absorption spectrum of the film was measured by an infrared spectrophotometer (1R-810 manufactured by Japan Spectroscopic Co., Ltd.). The content of the ethylene unit and the content of the propylene unit were obtained from the infrared absorption spectrum according to a method described in literatures (Sekigaikyusyu Supekutoru Niyona Poriechiren No Kyarakutarizeshon (Characterization of Polyethylene by Infrared Absorption Spectrum) by Takayama, Usami, et al., and Die Makromolekulare Chemie, 177, 461, (1976) by Mc Rae, M. A., Maddms, W. F, et al.).

(2) Content of 5-Ethylidene-2-norbornene Unit (Unit: by Weight)

Three types of ethylene-propylene-(5-ethylidene-2-norbornene) copolymer rubbers having different iodine values in accordance with "JIS K0070-1992 6. Iodine Value" were each molded into a film having a thickness of about 0.2 mm by a hot press machine. A peak derived from 5-ethylidene-2-norbornene (absorption peak at 1686 $cm^{-1}$) and a base peak (absorption peak at 1664 to 1674 $cm^{-1}$) for each film were measured by an infrared spectrophotometer (IR-700 manufactured by JASCO Corporation) and the IR index was calculated by the following formula (1). A is the transmittance at the base peak, B is the transmittance at the peak derived from 5-ethylidene-2-norbornene, and D (mm) is the thickness of the film.

$$\text{IR index} = \text{Log}(A/B)/D \quad \text{formula (1)}$$

The following formula (2) representing a calibration curve of iodine values was obtained from the IR indices and the above known iodine values.

$$\text{iodine value} = \alpha \times \text{IR index} + \beta \quad \text{formula (2)}$$

$\alpha$ and $\beta$ in formula (2) are each a constant. The ethylene-propylene-(5-ethylidene-2-norbornene) copolymer rubber of an Example was molded into a film having a thickness of about 0.2 mm by a hot press machine, the iodine value was obtained from the IR index obtained by the above infrared spectrophotometer, and the content of the 5-ethylidene-2-norbornene unit was calculated by the following formula (3).

$$\begin{aligned}\text{(the content of the 5-ethylidene-2-norbornene unit)} =\\ \text{(the iodine value)} \times \text{(the molecular weight of}\\ \text{5-ethylidene-2-norbornene)} \div \text{(the molecular}\\ \text{weight of iodine)} \quad \text{formula (3)}\end{aligned}$$

(3) Limiting Viscosity (Unit: dl/g)

The reduced viscosity (viscosity number) of a solution in which the concentration was known was measured in tetralin at 135° C. using an Ubbelohde viscometer, and the limiting viscosity was obtained from the measurement result according to the calculation method described in "Kobunshi Yoeki (Polymer Solutions), Kobunshi Jikkengaku (Polymer Experimental Science) 11" (published by Kyoritsu Shuppan Co., Ltd. in 1982), p. 491.

(4) Molecular Weight Distribution

The weight average molecular weight (Mw) and the number average molecular weight (Mn) in terms of polystyrene were measured under the conditions of the following (1) to (8) using GPC, and from these, the molecular weight distribution (Mw/Mn) was further obtained.

(1) GPC apparatus: trade name HLC-8121GPC/HT, manufactured by Tosoh Corporation.

(2) Column: trade name TSKgel GMHHR-H(S)HT, manufactured by Tosoh Corporation (3) Molecular weight standard substance: polystyrene having a molecular weight of 500 or more and 20000000 or less (4) Elution solvent flow velocity: 1.0 ml/min (5) Measurement temperature: 140° C.

(6) Elution solvent: orthodichlorobenzene (7) Sample injection amount: 50 µl (8) Detector: differential refractometer (5) Oil Resistance Test (Unit: %)

The oil resistance test was performed in accordance with JIS K 6258. First, a test piece 40 mm long, 25 mm wide, and 2 mm thick was cut from a molded article. Then, the weight of this test piece in air and the weight of this test piece in pure water were measured. An automatic hydrometer (manufactured by Toyo Seiki Seisaku-sho, Ltd.) was used for the measurement.

Then, the test piece was immersed in a lubricant (trade name: IRM903, manufactured by Japan Sun Oil Company, Ltd.). The temperature of the lubricant at this time was 125° C., and the immersion time was 70 hours.

After the completion of the immersion, the excess lubricant adhering to the surface of the test piece was removed, and the weight of the test piece in air and in water was measured by the same method as the above.

The above measured values were substituted into the following formula to calculate the volume change rate ($\Delta V$) of the test piece.

The above procedure was carried out on two test pieces prepared under the same conditions. $\Delta V$ in Table 1 is the average value of the $\Delta V$ of two test pieces.

As the value of $\Delta V$ becomes smaller, the molded article becomes better in oil resistance.

$$\Delta V = (m_3 - m_4) - (m_1 - m_2)/(m_1 - m_2) \times 100$$

$\Delta V$: volume change rate (%)

$m_1$: weight in air before immersion (mg)

$m_2$: weight in water before immersion (mg)

$m_3$: weight in air after immersion (mg)

$m_4$: weight in water after immersion (mg)

Example 1

(Production of Component (A)-1)

Hexane, ethylene, and propylene were supplied to a first polymerization vessel made of stainless steel equipped with a stirrer at rates of 318 g/(hr·L), 18.9 g/(hr·L), and 57.9 g/(hr·L) respectively per unit time and unit polymerization vessel volume. $VOCl_3$, ethylaluminum sesquichloride (hereinafter described as EASC), and hydrogen were supplied to the first polymerization vessel at rates of 15.3 mg/(hr·L), 122.9 mg/(hr·L), and 0.005 NL/(hr·L) respectively. 5-Ethylidene-2-norbornene was further supplied to the first polymerization vessel at a rate of 1.40 g/(hr·L). The temperature of the first polymerization vessel was kept at 48° C. 19 g/(hr·L) of an ethylene-propylene-(5-ethylidene-2-norbornene) copolymer rubber component was produced in the first polymerization vessel. The content of the ethylene unit/the content of the propylene unit (molar ratio) of the copolymer rubber was 0.80/0.20, and the content of the 5-ethylidene-2-norbornene unit was 5.4% by weight (where the weight of the ethylene-propylene-(5-ethylidene-2-norbornene) copolymer rubber component was 100% by weight).

The polymerization solution drawn from the first polymerization vessel was fed to a second polymerization vessel made of stainless steel having the same volume as the first polymerization vessel and equipped with a stirrer. Further, hexane, ethylene, and propylene were supplied at rates of 159 g/(hr·L), 12.4 g/(hr·L), and 53.1 g/(hr·L) respectively per unit time and unit polymerization vessel volume. $VOCl_3$ and ethylaluminum sesquichloride (EASC) were supplied to the second polymerization vessel at rates of 9.0 mg and 35.8 mg/(hr·L) respectively. The temperature of the second polymerization vessel was kept at 51° C. As a result of analyzing the polymerization solution drawn from the second polymerization vessel, the production amount of an ethylene-propylene-(5-ethylidene-2-norbornene) copolymer rubber (hereinafter described as a component: (A)-1) was 28 g/(hr·L) per unit time and unit polymerization vessel volume.

When the total of the content of the ethylene unit and the content of the propylene unit in the component (A)-1 was 100 mol %, the content of the ethylene unit was 80 mol %, and the content of the propylene unit was 20 mol %. The content of the 5-ethylidene-2-norbornene unit was 5.4% by weight (the total amount of the component (A)-1 was 100% by weight). The limiting viscosity of the obtained component (A)-1 measured in 135° C. tetralin was 4.1 and the molecular weight distribution was 2.5.

From the values of the production amount of the ethylene-propylene-(5-ethylidene-2-norbornene) copolymer rubber component obtained in the first polymerization vessel and the component (A)-1, the content of the ethylene unit/the content of the propylene unit (molar ratio), and the content of the 5-ethylidene-2-norbornene unit, it was found that 9 g/(hr·L) of an ethylene-propylene-(5-ethylidene-2-norbornene) copolymer rubber component per unit time and unit polymerization vessel volume was produced in the second polymerization vessel, and the content of the ethylene unit/the content of the propylene unit (molar ratio) of the copolymer rubber component was 0.80/0.20, and the content of the 5-ethylidene-2-norbornene unit was 5.4% by weight (where the weight in the ethylene-propylene-(5-ethylidene-2-norbornene) copolymer rubber component was 100% by weight).

Then, the polymerization solution drawn from the second polymerization vessel was fed to an oil vessel, and 28 g/(hr·L) of a paraffin-based oil as an extender oil was supplied. The polymerization solvent was removed from the obtained polymerization solution to obtain the component (A)-1 containing the extender oil.

(Production of Molded Article)

200 parts by weight of the component (A)-1 containing 100 parts by weight of the extender oil obtained by the above method, 10 parts by weight of a diallyl isophthalate prepolymer (trade name "DAISO ISODAP," manufactured by DAISO CO., LTD.) as a component (C), and the following additives were kneaded at a rotor revolution number of 60 rpm for 5 minutes using a 1700 ml Banbury mixer (manufactured by Kobe Steel, Ltd.) adjusted at a start temperature of 70° C.

(Additives)

Carbon black (trade name "Asahi 65," manufactured by Asahi Carbon Co., Ltd.): 145 parts by weight Magnesium silicate (trade name "High toron," manufactured by Takehara Kagaku Kogyo Co., Ltd.): 30 parts by weight Process oil (trade name "PW90," manufactured by Idemitsu Petrochemical Co., Ltd.): 20 parts by weight Stearic acid (trade name "STEARIC ACID 50S," manufactured by New Japan Chemical Co., Ltd.): 3 parts by weight Zinc oxide (trade name "Zinc Oxide II," manufactured by SEIDO CHEMICAL INDUSTRY CO LID.): 5 parts by weight Polyethylene glycol (trade name PEG4000 N, manufactured by Sanyo Chemical Industries, Ltd.): 2 parts by weight Mercaptobenzimidazole (trade name "ANTAGE MB," manufactured by Kawaguchi Chemical Industry Co. LTD): 1 part by weight Polymer of 2,2,4-trimethyl-1,2-dihydroquinoline (trade name "ANTAGE RD," manufactured by Kawaguchi Chemical Industry Co. LTD.): 0.25 parts by weight Methacrylic silane coupling agent (3-methacryloxypropyltrimethoxysilane, trade name "Dynasylan MEMO," manufactured by Evonik): 1 part by weight Then, 6 parts by weight of dicumyl peroxide ("PERCUMYL D" manufactured by NOF CORPORATION) as a component (B) and 3 parts by weight of ethylene glycol dimethacrylate ("Acryester ED" manufactured by MITSUBISHI RAYON CO., LTD.) as a vulcanizing coagent were added and kneaded using an 8 inch open roll (manufactured by KANSAI ROLL Co., Ltd.) to obtain a rubber composition.

The obtained rubber composition was vulcanized at an applied pressure of 10 MPa and a set temperature of 170° C. for 10 minutes using a press molding machine (trade name: PSF-B010, manufactured by KANSAI ROLL Co., Ltd.) to obtain a sheet-shaped molded article having a thickness of 2 mm. The result of the oil resistance test of the obtained molded article is shown in Table 1.

Example 2

A molded article was produced by the same method as Example 1 except that the content of the component (C) was 20 parts by weight. The result of the oil resistance test of the obtained molded article is shown in Table 1.

Example 3

(Production of Component (A)-2)

Hexane, ethylene, and propylene were supplied to a first polymerization vessel made of stainless steel equipped with a stirrer at rates of 777 b/(hr·L), 32.6 g/(hr·L), and 75.4 g/(hr·L) respectively per unit time and unit polymerization vessel volume. VOCl$_3$ and ethanol were supplied to the first polymerization vessel at rates of 23.4 mg/(hr·L) and 11.2 mg/(hr·L) (VOCl$_3$/ethanol=1/1.8 (molar ratio)) respectively after being mixed and stirred by a line mixer. In addition, EASC and hydrogen were supplied to the first polymerization vessel at rates of 133.3 mg/(hr·L) and 0.005 NL/(hr·L) respectively. 5-Ethylidene-2-norbornene was further supplied to the first polymerization vessel at a rate of 8.78 g/(hr·L). The temperature of the first polymerization vessel was kept at 44° C. A polymerization solution containing 38 g/(hr·L) of an ethylene-propylene-(5-ethylidene-2-norbornene) copolymer rubber component per unit time and unit polymerization vessel volume was produced in the first polymerization vessel. The content of the ethylene unit/the content of the propylene unit (molar ratio) of the copolymer rubber component was 0.76/0.24, and the content of the 5-ethylidene-2-norbornene unit was 13.9% by weight (where the weight of the ethylene-propylene-(5-ethylidene-2-norbornene) copolymer rubber component was 100% by weight).

The polymerization solution drawn from the first polymerization vessel was fed to a second polymerization vessel made of stainless steel having the same volume as the first polymerization vessel and equipped with a stirrer. Hexane and ethylene were supplied at rates of 425 g/(hr·L) and 19.0 g/(hr·L) respectively per unit time and unit polymerization vessel volume. VO(O(iso-C$_3$H$_7$))$_{0.8}$Cl$_{2.2}$ was supplied to the second polymerization vessel at a rate of 16.8 mg/(hr·L). In addition, EASC was supplied to the second polymerization vessel at a rate of 33.9 mg/(hr·L), and the temperature of the second polymerization vessel was kept at 60° C. As a result of analyzing the polymerization solution drawn from the second polymerization vessel, the production amount of an ethylene-propylene-(5-ethylidene-2-norbornene) copolymer rubber (hereinafter described as a component (A)-2) was 54 g/(hr·L) per unit time and unit polymerization vessel volume.

When the total of the content of the ethylene unit and the content of the propylene unit in the component (A)-2 was 100 mol %, the content of the ethylene unit was 79 mol %, and the content of the propylene unit was 21 mol %. The content of the 5-ethylidene-2-norbornene unit was 13.3% by weight (where the total amount of the component (A)-2 was 100% by weight), the limiting viscosity of the component (A)-2 measured in 135° C. tetralin was 3.8 dl/g, and the molecular weight distribution was 2.5.

From the values of the production amount of the ethylene-propylene-(5-ethylidene-2-norbornene) copolymer rubber component obtained in the first polymerization vessel and the component (A)-2, the content of the ethylene unit/the content of the propylene unit (molar ratio), and the content of the 5-ethylidene-2-norbornene unit, it was found that 16 g/(hr·L) of an ethylene-propylene-(5-ethylidene-2-norbornene) copolymer rubber component per unit time and unit polymerization vessel volume was produced in the second polymerization vessel, and the content of the ethylene unit/the content of the propylene unit (molar ratio) of the copolymer rubber component was 0.88/0.12, and the content of the 5-ethylidene-2-norbornene unit was 11.8% by weight (where the weight of the ethylene-propylene-(5-ethylidene-2-norbornene) copolymer rubber component was 100% by weight).

Then, the polymerization solution drawn from the second polymerization vessel was fed to an oil vessel, and 54 g/(hr·L) of a paraffin-based oil as an extender oil was supplied. The polymerization solvent was removed from the obtained polymerization solution to obtain the component (A)-2 containing the extender oil. The content of the extender oil was 100 parts by weight based on 100 parts by weight of the component (A)-2.

(Production of Molded Article)

A molded article was produced by the same method as Example 2 except that 200 parts by weight of the component (A)-2 containing 100 parts by weight of the extender oil obtained by the above method was used. The result of the oil resistance test of the obtained molded article is shown in Table 1.

Example 4

(Production of Component (A)-3)

Hexane, ethylene, and propylene were supplied to a first polymerization vessel made of stainless steel equipped with a stirrer at rates of 518 g/(hr·L), 17.5 g/(hr·L), and 77.2 g/(hr·L) respectively per unit time and unit polymerization vessel volume. VOCl$_3$ was supplied to the first polymerization vessel at a rate of 14.6 mg/(hr·L) after being mixed and stirred by a line mixer. In addition, ethylaluminum sesquichloride (EASC) was supplied to the first polymerization vessel at a rate of 83.2 mg/(hr·L). 5-Ethylidene-2-norbornene was further supplied to the first polymerization vessel at a rate of 3.56 g/(hr·L). The temperature of the first polymerization vessel was kept at 39° C. A polymerization solution containing 22 g/(hr·L) of an ethylene-propylene-(5-ethylidene-2-norbornene) copolymer rubber component per unit time and unit polymerization vessel volume was produced in the first polymerization vessel. The content of the ethylene unit/the content of the propylene unit (molar ratio) of the copolymer rubber component was 0.71/0.29, and the content of the 5-ethylidene-2-norbornene unit was 10.4% by weight (where the weight of the ethylene-propylene-(5-ethylidene-2-norbornene) copolymer rubber component was 100% by weight).

The polymerization solution drawn from the first polymerization vessel was fed to a second polymerization vessel made of stainless steel having the same volume as the first polymerization vessel and equipped with a stirrer. Hexane, ethylene, and propylene were supplied at rates of 259 g/(hr·L), 11.3 g/(hr·L), and 69.8 g/(hr·L) respectively per unit time and unit polymerization vessel volume. VOCl$_3$ was supplied to the second polymerization vessel at a rate of 22.3 mg/(hr·L) after being mixed and stirred by a line mixer. In addition, EASC and hydrogen were supplied to the second polymerization vessel at rates of 127.4 mg/(hr·L) and 0.015 NL/(hr·L) respectively, and the temperature of the second polymerization vessel was kept at 46° C. As a result of analyzing the polymerization solution drawn from the second polymerization vessel, the production amount of an ethylene-propylene-(5-ethylidene-2-norbornene) copolymer rubber (hereinafter described as a component (A)-3) was 32 g/(hr·L) per unit time and unit polymerization vessel volume.

When the total of the content of the ethylene unit and the content of the propylene unit in the component (A)-3, the content of the ethylene unit was 100 mol % was 71 mol %, and the content of the propylene unit was 29 mol %. The content of the 5-ethylidene-2-norbornene unit was 11.3% by weight (where the total amount of the component (A)-3 was 100% by weight), the limiting viscosity of the component (A)-3 measured in 135° C. tetralin was 3.1 dl/g, and the molecular weight distribution was 3.9.

From the values of the production amount of the ethylene-propylene-(5-ethylidene-2-norbornene) copolymer rubber component obtained in the first polymerization vessel and the component (A)-3, the content of the ethylene unit/the content of the propylene unit (molar ratio), and the content of the 5-ethylidene-2-norbornene unit, it was found that 10.8 g/(hr·L) of an ethylene-propylene-(5-ethylidene-2-norbornene) copolymer rubber component per unit time and unit polymerization vessel volume was produced in the second polymerization vessel, and the content of the ethylene unit/the content of the propylene unit (molar ratio) of the copolymer rubber component was 0.71/0.29, and the content of the 5-ethylidene-2-norbornene unit was 13.2% by weight (where the weight of the ethylene-propylene-(5-ethylidene-2-norbornene) copolymer rubber component was 100% by weight).

Then, the polymerization solution drawn from the second polymerization vessel was fed to an oil vessel, and 12.9 g/(hr·L) of a paraffin-based oil as an extender oil was supplied. The polymerization solvent was removed from the obtained polymerization solution to obtain the component (A)-3 containing the extender oil. The content of the extender oil was 40 parts by weight based on 100 parts by weight of the component (A)-3.

A molded article was produced by the same method as Example 1 except that 140 parts by weight of the component (A)-3 containing 40 parts by weight of the extender oil obtained by the above method was used, and the addition amount of the process oil (trade name "PW90," manufactured by Idemitsu Petrochemical Co., Ltd.) was changed from 20 parts by weight to 80 parts by weight. The result of the oil resistance test of the obtained molded article is shown in Table 1.

Comparative Example 1

(Production of Component (A)-4)

Hexane, ethylene, and propylene were supplied to a first polymerization vessel made of stainless steel equipped with a stirrer at rates of 221 g/(hr·L), 25.3 g/(hr·L), and 62.1 g/(hr·L) respectively per unit time and unit polymerization vessel volume. VOCl$_3$ was supplied to the first polymerization vessel at a rate of 29.5 mg/(hr·L) after being mixed and stirred by a line mixer. In addition, EASC and hydrogen were supplied to the first polymerization vessel at rates of 177.1 mg/(hr·L) and 0.077 NL/(hr·L) respectively. 5-Ethylidene-2-norbornene was further supplied to the first polymerization vessel at a rate of 1.76 g/(hr·L). The temperature of the first polymerization vessel was kept at 50° C. A polymerization solution containing 30 g/(hr·L) of an ethylene-propylene-(5-ethylidene-2-norbornene) copolymer rubber component per unit time and unit polymerization vessel volume was produced in the first polymerization vessel. The content of the ethylene unit/the content of the propylene unit (molar ratio) of the copolymer rubber component was 0.78/0.22, and the content of the 5-ethylidene-2-norbornene unit was 5.2% by weight (where the weight of the ethylene-propylene-(5-ethylidene-2-norbornene) copolymer rubber component was 100% by weight).

The polymerization solution drawn from the first polymerization vessel was fed to a second polymerization vessel made of stainless steel having the same volume as the first polymerization vessel and equipped with a stirrer. Hexane, ethylene, and propylene were supplied at rates of 111 g/(hr·L), 15.3 g/(hr·L), and 53.5 g/(hr·L) respectively per unit time and unit polymerization vessel volume. VOCl$_3$ was supplied to the second polymerization vessel at a rate of 25.8 mg/(hr·L) after being mixed and stirred by a line mixer. In addition, EASC was supplied to the second polymerization vessel at a rate of 77.4 mg/(hr·L), and the temperature of the second polymerization vessel was kept at 58° C. As a result of analyzing the polymerization solution drawn from the second polymerization vessel, the production amount of an ethylene-propylene-(5-ethylidene-2-norbornene) copolymer rubber (hereinafter described as a component (A)-4) was 45 g/(hr·L) per unit time and unit polymerization vessel volume.

When the total of the content of the ethylene unit and the content of the propylene unit in the component (A)-4 was 100 mol %, the content of the ethylene unit was 78 mol %, and the content of the propylene unit was 22 mol %. The content of the 5-ethylidene-2-norbornene unit was 5.2% by weight (the total amount of the component (A)-4 was 100% by weight), the limiting viscosity of the component (A)-4 measured in 135° C. tetralin was 2.1 dl/g, and the molecular weight distribution was 2.4.

From the values of the production amount, the content of the ethylene unit/the content of the propylene unit (molar ratio), and the content of the 5-ethylidene-2-norbornene unit for the ethylene-propylene-(5-ethylidene-2-norbornene) copolymer rubber component obtained in the first polymerization vessel and the component (A)-4, it was found that 15 g/(hr·L) of an ethylene-propylene-(5-ethylidene-2-norbornene) copolymer rubber component per unit time and unit polymerization vessel volume was produced in the second polymerization vessel, and the content of the ethylene unit/the content of the propylene unit (molar ratio) of the copolymer rubber component was 0.78/0.22, and the content of the 5-ethylidene-2-norbornene unit was 5.2% by weight (where the weight of the ethylene-propylene-(5-ethylidene-2-norbornene) copolymer rubber component was 100% by weight).

A molded article was produced by the same method as Example 1 except that 100 parts by weight of the component (A)-4 obtained by the above method was used, the addition amount of the process oil (trade name "PW90," manufactured by Idemitsu Petrochemical Co., Ltd.) was changed from 20 parts by Weight to 120 parts by weight, and the component (C) was not added. The result of the oil resistance test is shown in Table 1.

Comparative Example 2

A molded article was produced by the same method as Comparative Example 1 except that the content of the component (C) was 10 parts by weight. The result of the oil resistance test of the obtained molded article is shown in Table 1.

Comparative Example 3

A molded article was produced by the same method as Example 4 except that the component (C) was not added. The result of the oil resistance test of the obtained molded article is shown in Table 1.

TABLE 1

| | Example 1 | Example 2 | Example 3 | Example 4 | Comparative Example 1 | Comparative Example 2 | Comparative Example 3 |
|---|---|---|---|---|---|---|---|
| Amount blended (parts by weight) | | | | | | | |
| Component (A)-1 (containing 100 parts by weight of extender oil) | 200 | 200 | | | | | |
| Component (A)-2 (containing 100 parts by weight of extender oil) | | | 200 | | | | |
| Component (A)-3 (containing 40 parts by weight of extender oil) | | | | 140 | | | 140 |
| Component (A)-4 | | | | | 100 | 100 | |
| Component (B) | 6 | 6 | 6 | 6 | 6 | 6 | 6 |
| Component (C) | 10 | 20 | 20 | 10 | 0 | 10 | 0 |
| Evaluation | | | | | | | |
| Oil resistance test ΔV (%) | +68 | +61 | +40 | +62 | +89 | +74 | +74 |

INDUSTRIAL APPLICABILITY

According to the present invention, it is possible to obtain a molded article exhibiting excellent oil resistance under high temperature, based on an ethylene-α-olefin-nonconjugated polyene copolymer rubber composition.

The invention claimed is:

1. A rubber composition comprising the following component (A), the following component (B), and the following component (C), wherein:
   the component (A) is an ethylene-α-olefin-nonconjugated polyene copolymer rubber containing an ethylene unit, an α-olefin unit and a nonconjugated polyene unit, a number of carbon atoms of the α-olefin unit is 3 or more and 20 or less, a limiting viscosity measured in 135° C. tetralin is 2.8 dl/g or more and 5 dl/g or less, a content of the ethylene unit is 70 mol % or more and 90 mol % or less (where a total of the content of the ethylene unit and a content of the α-olefin unit in the component (A) is 100 mol %), and a content of the nonconjugated polyene unit is 2% by weight or more and 20% by weight or less (where a total amount of the component (A) is 100 wt % by weight);
   the component (B) is an organic peroxide; and
   the component (C) is a thermosetting prepolymer, wherein a molecular weight distribution (Mw/Mn) of the component (A) is 2 or more and 5 or less.

2. The rubber composition according to claim 1, wherein the component (C) is at least one thermosetting prepolymer selected from a group consisting of a diallyl phthalate prepolymer and a diallyl isophthalate prepolymer.

3. A molded article obtained by vulcanizing the rubber composition according to claim 1.

4. A molded article obtained by vulcanizing the rubber composition according to claim 2.

* * * * *